US010424796B2

(12) United States Patent
Hasegawa et al.

(10) Patent No.: US 10,424,796 B2
(45) Date of Patent: Sep. 24, 2019

(54) FUEL CELL SYSTEM

(71) Applicant: TOYOTA JIDOSHA KABUSHIKI KAISHA, Toyota-shi, Aichi-ken (JP)

(72) Inventors: Shigeki Hasegawa, Toyota (JP); Masashi Toida, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 66 days.

(21) Appl. No.: 15/638,540

(22) Filed: Jun. 30, 2017

(65) Prior Publication Data
US 2018/0034076 A1     Feb. 1, 2018

(30) Foreign Application Priority Data

Jul. 26, 2016   (JP) .................................. 2016-145913

(51) Int. Cl.
*H01M 8/0432*     (2016.01)
*H01M 8/04029*    (2016.01)
(Continued)

(52) U.S. Cl.
CPC .............. *H01M 8/0432* (2013.01); *B60L 7/14* (2013.01); *B60L 7/16* (2013.01); *B60L 50/71* (2019.02);
(Continued)

(58) Field of Classification Search
CPC ........... H01M 8/0432; H01M 8/04302; H01M 8/04029; H01M 8/04067; H01M 8/04089;
(Continued)

(56) References Cited

U.S. PATENT DOCUMENTS

2005/0112424 A1 *  5/2005  Hirano ................ B60L 11/1885
                                                    429/415
2015/0380755 A1 * 12/2015  Kazuno ............. H01M 8/04873
                                                    429/432
2016/0141691 A1 *  5/2016  Okamoto .......... H01M 8/04992
                                                    429/434

FOREIGN PATENT DOCUMENTS

JP        2007-157414 A      6/2007

* cited by examiner

*Primary Examiner* — Sean P Cullen
(74) *Attorney, Agent, or Firm* — Dickinson Wright, PLLC

(57) ABSTRACT

There is provided a fuel cell system comprising a first fuel stack, a first temperature gauge configured to measure a first temperature value, a power generation voltage meter configured to measure a power generation voltage, a cell voltage meter and a controller configured to control a temperature regulating mechanism such as to perform a temperature rise of the fuel cell stack. The controller is further configured to start the temperature rise of the fuel cell stack when a cell voltage is lower than a predetermined voltage value. When at least one of a plurality of time measurement conditions is satisfied after the first temperature value has reached a first reference temperature after a start of the temperature rise, the controller measures a time duration during which a voltage difference by subtracting the cell voltage from an average voltage of cells is maintained to be not greater than a predetermined voltage difference. When the measured time duration has reached a first reference time, the controller terminates the temperature rise. The plurality of time measurement conditions are conditions that predetermined time periods have elapsed since termination of a warm-up operation, since termination of an intermittent operation, since termination of regenerative braking and since a shift of the state of the fuel cell stack to a power generation capable state.

7 Claims, 4 Drawing Sheets

(51) Int. Cl.
*H01M 8/04007* (2016.01)
*H01M 8/04537* (2016.01)
*H01M 8/04701* (2016.01)
*H01M 8/04746* (2016.01)
*H01M 8/24* (2016.01)
*H01M 8/04955* (2016.01)
*H01M 8/04089* (2016.01)
*H01M 8/04302* (2016.01)
*B60L 7/14* (2006.01)
*B60L 7/16* (2006.01)
*B60L 50/72* (2019.01)
*B60L 58/40* (2019.01)
*B60L 58/33* (2019.01)
*B60L 50/71* (2019.01)

(52) U.S. Cl.
CPC ............... *B60L 50/72* (2019.02); *B60L 58/33* (2019.02); *B60L 58/40* (2019.02); *H01M 8/04029* (2013.01); *H01M 8/04067* (2013.01); *H01M 8/04089* (2013.01); *H01M 8/04302* (2016.02); *H01M 8/04544* (2013.01); *H01M 8/04559* (2013.01); *H01M 8/04604* (2013.01); *H01M 8/04619* (2013.01); *H01M 8/04701* (2013.01); *H01M 8/04753* (2013.01); *H01M 8/04955* (2013.01); *H01M 8/24* (2013.01); *B60L 2240/36* (2013.01); *B60L 2240/80* (2013.01); *H01M 2250/20* (2013.01); *Y02T 90/32* (2013.01)

(58) Field of Classification Search
CPC ......... H01M 8/04544; H01M 8/04559; H01M 8/04604; H01M 8/04619; H01M 8/04701; H01M 8/04753; H01M 8/04955; H01M 8/24; B60L 11/1887; B60L 11/1892; B60L 11/1896; B60L 11/1898; B60L 7/14; B60L 7/16
USPC ........ 429/415, 427, 429, 432, 433, 434, 436
See application file for complete search history.

FUEL CELL SYSTEM

CROSS-REFERENCE TO RELATED APPLICATIONS

The present application claims priority to Japanese patent application 2016-145913 filed on Jul. 26, 2016, the entirety of the content of which is hereby incorporated by reference for all purpose.

BACKGROUND

Field

The present disclosure relates to a fuel cell system.

Related Art

In a fuel cell system including a fuel cell stack configured by stacking a plurality of cells, when there is a possibility that flooding occurs in any of the cells, a known configuration of the fuel cell system raises the temperature of the fuel cell stack, such as to dry the cell. For example, JP 2007-157414A describes a fuel cell system configured to determine the occurrence of flooding and perform a temperature rise when the power generation voltage of the cell is equal to or lower than a predetermined reference value and the impedance of the fuel cell stack is equal to or lower than a predetermined reference value.

The power generation voltage of the cell is, however, likely to be decreased due to a reason other than the flooding. The configuration of raising the temperature of the cell without taking into account such a likelihood may cause a problem that the cell is excessively dried. There is accordingly a demand for a technique that suppresses the cell from being excessively dried in the fuel cell system that is configured to perform a temperature rise when the flooding is likely to occur.

SUMMARY

According to one aspect of the disclosure, there is provided a fuel cell system. This fuel cell system comprises a fuel cell stack configured by stacking a plurality of cells in a stacking direction, each cell receiving supplies of an anode gas and a cathode gas to generate electric power; a temperature regulating mechanism configured to regulate temperature of the fuel cell stack; a first temperature gauge configured to measure a first temperature value that reflects the temperature of the fuel cell stack; a power generation voltage meter configured to measure a power generation voltage by the fuel cell stack; a cell voltage meter configured to measure a cell voltage with respect to at least part of the plurality of cells as measurement object cells; and a controller configured to control the temperature regulating mechanism such as to perform a temperature rise of the fuel cell stack by using at least the cell voltage measured by the cell voltage meter and the first temperature value measured by the first temperature gauge. The controller is further configured to start the temperature rise of the fuel cell stack when at least one cell voltage among cell voltages of the measurement object cells is lower than a predetermined voltage value. When at least one of a plurality of time measurement conditions is satisfied after the first temperature value has reached a first reference temperature after the start of the temperature rise, the controller measures a time duration during which a voltage difference by subtracting the at least one cell voltage among the cell voltages of the measurement object cells from an average voltage of the plurality of cells of the fuel cell stack is maintained to be not greater than a predetermined voltage difference, wherein the average voltage of the plurality of cells of the fuel cell stack is determined from the voltage measured by the cell voltage meter or by the power generation voltage meter; and when none of the plurality of time measurement conditions is satisfied, the controller does not measure the time duration. When the measured time duration reaches a first reference time, the controller controls the temperature regulating mechanism, such as to terminate the temperature rise. The plurality of time measurement conditions include a first condition, a second condition, a third condition and a fourth condition. The first condition is a condition that a predetermined time period has elapsed since termination of a warm-up operation that uses heat generated in the fuel cell stack to warm up the fuel cell stack. The second condition is a condition that a predetermined time period has elapsed since termination of an intermittent operation that is performed to temporarily stop power generation by the fuel cell stack. The third condition is a condition that a predetermined time period has elapsed since termination of regenerative braking that regenerates electric power generated by a driving motor included in a vehicle equipped with the fuel cell system, such as to be used as a braking force of the vehicle. The fourth condition is a condition that a predetermined time period has elapsed since a shift of state of the fuel cell stack to a power generation capable state after a start of the fuel cell system.

When the plurality of time measurement conditions are not satisfied, the cathode gas is unlikely to be sufficiently supplied to the fuel cell stack. There is accordingly a possibility that the cell voltage is decreased due to a reason other than the flooding. According to the fuel cell system of this aspect, however, when at least one of the plurality of time measurement conditions is satisfied, the controller is configured to measure the time duration for termination of the temperature rise, i.e., the time duration during which the voltage difference by subtracting the at least one cell voltage among the cell voltages of the measurement object cells from the average voltage of the plurality of cells is maintained to be not greater than the predetermined voltage difference. Otherwise the controller is configured not to measure the time duration. This configuration enables the time duration for termination of the temperature rise to be measured appropriately and thereby suppresses the cell from being excessively dried by the temperature rise of the fuel cell stack.

DESCRIPTION OF EMBODIMENTS

A. Embodiment

A1. Configuration of Fuel Cell System

Figure 1:
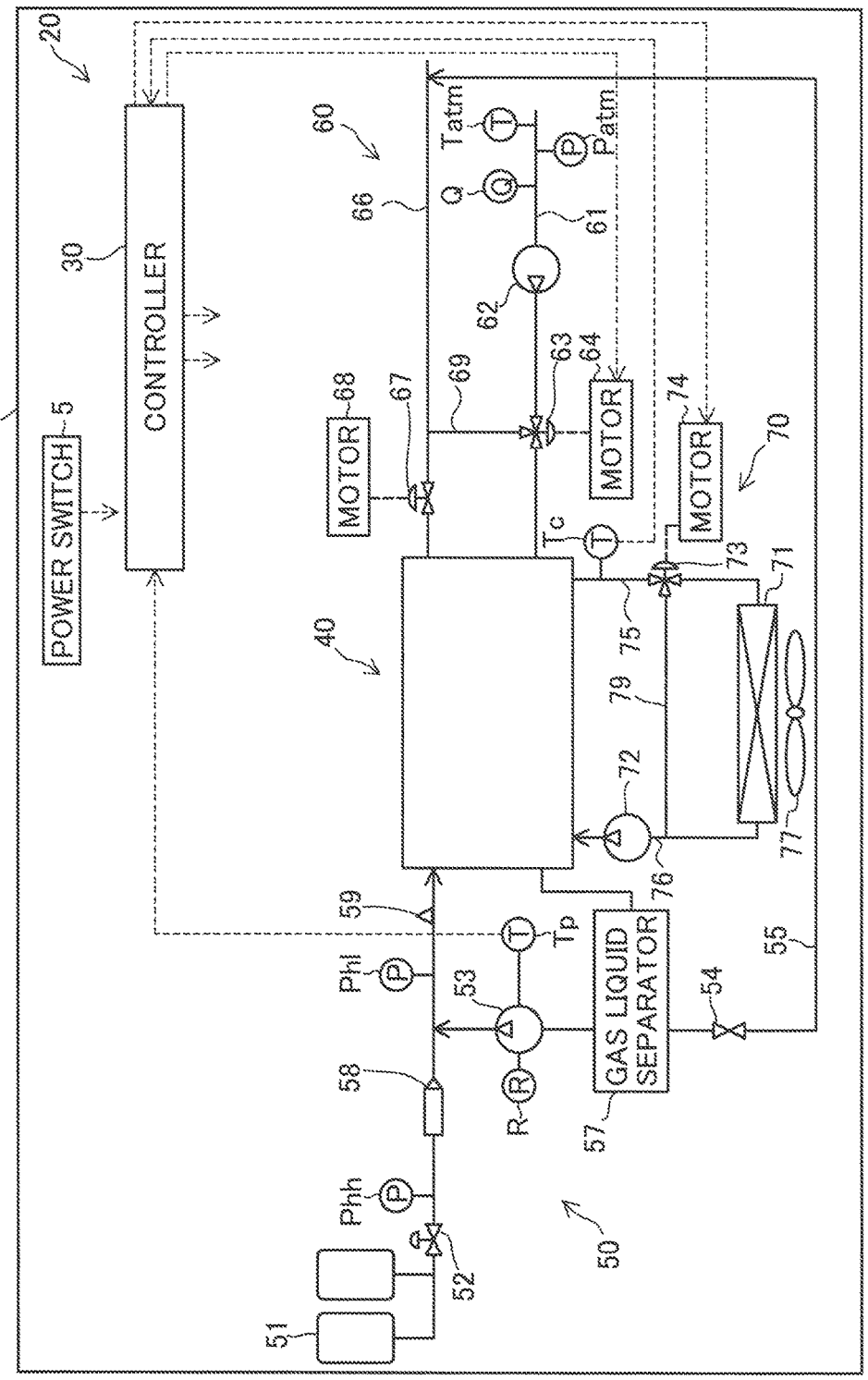
FIG. 1 is a block diagram illustrating the schematic configuration of a fuel cell system according to one embodiment of the present disclosure.

FIG. 1 is a block diagram illustrating the schematic configuration of a fuel cell system 20 according to one embodiment of the present disclosure. According to the embodiment, the fuel cell system 20 is mounted on a vehicle 1. The fuel cell system 20 is configured to include a fuel cell stack 40, a hydrogen supply discharge mechanism 50, an air supply discharge mechanism 60, a cooling water circulation mechanism 70 and a controller 30. The fuel cell system 20 is started in response to an ON operation of a power switch 5 and is stopped in response to an OFF operation of the power switch 5. The power switch 5 corresponds to an ignition switch of an engine automobile and serves as an input interface to change over between a parking state and a drivable state of the vehicle 1.

The fuel cell stack 40 is configured by stacking a plurality of cells configured to generate electric power by a reaction of an anode gas (fuel gas) with a cathode gas (oxidizing gas), in a stacking direction (described later). According to the embodiment, the cell denotes a polymer electrolyte fuel cell. According to the embodiment, the anode gas is hydrogen, and the cathode gas is oxygen included in the air.

The hydrogen supply discharge mechanism 50 is provided to supply and discharge hydrogen to and from anodes of the fuel cell stack 40 and is configured to include a hydrogen tank 51, a regulator 52, a hydrogen pump 53, a drainage shutoff valve 54, a discharge flow path 55, a gas liquid separator 57, an injector 58, a low-pressure relief valve 59, a high pressure-side pressure gauge Phh, a low pressure-side pressure gauge Phl, a second temperature gauge Tp and a resolver R.

The hydrogen tank 51 is provided to store hydrogen. The regulator 52 is configured to regulate the pressure of hydrogen stored in the hydrogen tank 51 and supply the hydrogen of the regulated pressure to the injector 58. The injector 58 is configured to inject the supplied hydrogen toward the anodes under control of the controller 30. The gas liquid separator 57 is configured to separate the discharge from the anodes into a gas and a liquid. The hydrogen pump 53 is configured to resupply the gas separated by the gas liquid separator 57 to the fuel cell stack 40. The gas separated by the gas liquid separator 57 mainly includes hydrogen that is not consumed and is discharged, nitrogen that is transmitted through a sealing members-integrated MEA (described later) from the cathode side, and the moisture that is not separated by the gas liquid separator 57. The discharge flow path 55 is a flow passage arranged to connect the gas liquid separator 57 with an air discharge flow path 66 (described later) provided in the air supply discharge mechanism 60. The drainage shutoff valve 54 is provided on the discharge flow path 55. The drainage shutoff valve 54 is opened to discharge nitrogen and the liquid separated by the gas liquid separator 57. The supply amount of hydrogen to the fuel cell stack 40 is regulated by controlling the injector 58 and the drainage shutoff valve 54. The high pressure-side pressure gauge Phh is configured to measure the pressure of hydrogen between the regulator 52 and the injector 58. The low pressure-side pressure guage Phl is configured to measure the pressure of hydrogen (supply pressure) prior to the inflow into the fuel cell stack 40. The second temperature gauge Tp is configured to measure the temperature of the hydrogen pump 53. More specifically, the second temperature gauge Tp is configured to measure the temperature of a motor core (described later) built in the hydrogen pump 53. The measurement result of the second temperature gauge Tp is also called "second temperature value". The second temperature gauge Tp serves as a thermometer configured to measure the second temperature value and send (input) the measured second temperature value to (into) the controller 30. In the description below, the measurement value of the second temperature gauge Tp is also called "hydrogen pump temperature". The resolver R is configured to measure the rotation speed of the hydrogen pump 53. More specifically, the resolver R is configured to measure the rotation speed of a pump portion of the hydrogen pump 53. The low-pressure relief valve 59 is opened to release hydrogen to the atmosphere when a difference between the supply pressure and the atmospheric pressure reaches a predetermined reference value.

The air supply discharge mechanism 60 is provided to supply and discharge the air to and from cathodes of the fuel cell stack 40 and is configured to include an air supply flow path 61, a compressor 62, a flow dividing valve 63, a motor for flow dividing valve 64, an air discharge flow path 66, a pressure regulator 67, a motor for pressure regulator 68, a bypass flow path 69, an atmospheric pressure gauge Patm, an ambient temperature gauge Tatm and a flowmeter Q.

The air supply flow path 61 and the air discharge flow path 66 are flow passages respectively arranged to connect the fuel cell stack 40 with their respective open air ports. The bypass flow path 69 is a flow passage that is branched off from the air supply flow path 61 at a position on the upstream side of the fuel cell stack 40 and is connected with the air discharge flow path 66. The compressor 62 is provided in the middle of the air supply flow path 61 and is configured to take in the air from the open air port side of the air supply flow path 61 and compress the intake air. The compressor 62 is placed at a location that is nearer to the open air port than the position of connection of the air supply flow path 61 and the bypass flow path 69. The air supply flow path 61 is also called "cathode gas supply flow path". The gas flowing through the air discharge flow path 66 is also called "cathode off-gas", and the air discharge flow path 66 is also called "cathode gas discharge flow path".

The flow dividing valve 63 is provided on the downstream side of the compressor 62 in the air supply flow path 61 or more specifically between the compressor 62 and the fuel cell stack 40 and at the position of connection of the air supply flow path 61 and the bypass flow path 69. The flow dividing valve 63 is configured to change over the flow direction of the air from the compressor 62 to either the fuel cell stack 40-side or the bypass flow path 69-side. This type of flow dividing valve 63 is also called three-way valve. The motor for flow dividing valve 64 is connected with the flow dividing valve 63 and is configured to generate a torque that is used to regulate the opening position of the flow dividing valve 63. The bypass flow path 69 is a flow passage arranged to connect the flow dividing valve 63 with the air discharge flow path 66. The pressure regulator 67 is provided in the air discharge flow path 66 at a location on the fuel cell stack 40-side of the position of connection of the air discharge flow path 66 and the bypass flow path 69. The pressure regulator 67 is configured to regulate the flow passage area of the air discharge flow path 66 according to the opening position. The motor for pressure regulator 68 is connected with the pressure regulator 67 and is configured to generate a torque that is used to regulate the opening position of the pressure regulator 67. The air passing through the pressure regulator 67 subsequently passes through the position of connection of the air discharge flow path 66 and the bypass flow path 69 and is discharged through the open air port to the atmosphere. The flowmeter Q is configured to measure the flow rate of the air taken in by the compressor 62 (intake air). The ambient temperature gauge Tatm is configured to measure the temperature of the intake air. The atmospheric pressure gauge Patm is configured to measure the pressure of the intake air.

The cooling water circulation mechanism 70 is provided to cool down the fuel cell stack 40 and is configured to include a cooling water discharge flow path 75, a cooling water supply flow path 76, a bypass flow path 79, a flow dividing valve 73, a motor for flow dividing valve 74, a cooling water pump 72, a radiator 71, a radiator fan 77 and a water temperature gauge Tc. The cooling water circulation mechanism 70 is also called "temperature regulating mechanism".

The cooling water supply flow path 76 is a piping arranged to supply cooling water to the fuel cell stack 40. The flow of cooling water is driven by the cooling water pump 72 that is provided in the cooling water supply flow path 76 at a location on the fuel cell stack 40-side of the position of connection of the cooling water supply flow path 76 and the bypass flow path 79. The cooling water discharge flow path 75 is a piping arranged to discharge the cooling water from the fuel cell stack 40. The bypass flow path 79 is a flow passage that is branched off from the cooling water discharge flow path 75 at a position on the downstream side of the fuel cell stack 40 and is connected with the cooling water supply flow path 76.

The flow dividing valve 73 is provided on the downstream side of the fuel cell stack 40 in the cooling water discharge flow path 75 or more specifically between the radiator 71 and the fuel cell stack 40 and at the position of connection of the radiator 71 and the bypass flow path 79. The flow dividing valve 73 is configured to change over the flow direction of the cooling water from the fuel cell stack 40 to either the radiator 71-side or the bypass flow path 79-side. This type of flow dividing valve 73 is also called three-way valve. The motor for flow dividing valve 74 is connected with the flow dividing valve 73 and is configured to generate a torque that is used to regulate the opening position of the flow dividing valve 73. The radiator 71 is provided on the downstream side of the cooling water discharge flow path 75 and on the upstream side of the cooling water supply flow path 76. Heat release of the radiator 71 is accelerated by the blast from the radiator fan 77. The water temperature gauge Tc is configured to measure the discharge temperature of the cooling water. The discharge temperature herein denotes a temperature of the cooling water discharged from the fuel cell stack 40 prior to the inflow into the radiator 71. The water temperature gauge Tc is also called "first temperature gauge Tc". The measurement result of the water temperature gauge Tc is also called "first temperature value". The first temperature gauge Tc serves as a thermometer configured to measure the first temperature value that reflects the temperature of the fuel cell stack 40 and send (input) the measured first temperature value to (into) the controller 30. In the description below, the measurement result of the water temperature gauge Tc is also called "FC water temperature".

The controller 30 is specifically implemented by an ECU (electronic control unit). The controller 30 is configured to output signals that are used to control the operations of the fuel cell system 20. For example, the controller 30 is configured to control the flow dividing valve 63 and change over the flow direction of the air. The controller 30 is also configured to control the cooling water circulation mechanism 70 and raise the temperature of the fuel cell stack 40 by using at least a cell voltage measured by a cell voltage meter 91 and the first temperature value measured by the first temperature gauge Tc. The controller 30 is further configured to control the cooling water circulation mechanism 70, such that the first temperature value input from the first temperature gauge Tc becomes equal to a temperature specified as a target (target temperature). More specifically, when the first temperature value is lower than the target temperature, the controller 30 sends a signal to the motor for flow dividing valve 74 and controls the flow dividing valve 73 to change over the flow direction of the cooling water from the radiator 71-side to the bypass flow path 79-side. When the first temperature value is higher than the target temperature, on the other hand, the controller 30 sends a signal to the motor for flowing dividing valve 74 and controls the flow dividing valve 73 to change over the flow direction of the cooling water from the bypass flow path 79-side to the radiator 71-side and thereby flow the cooling water to the downstream side of the cooling water discharge flow path 75. Such control by the controller 30 causes the temperature of the fuel cell stack 40 to become equal to the target temperature. The controller 30 is further configured to control the respective components of the fuel cell system 20 and cause the fuel cell stack 40 to perform power generation, in response to a power generation request, for example, from a power management ECU.

Figure 2:
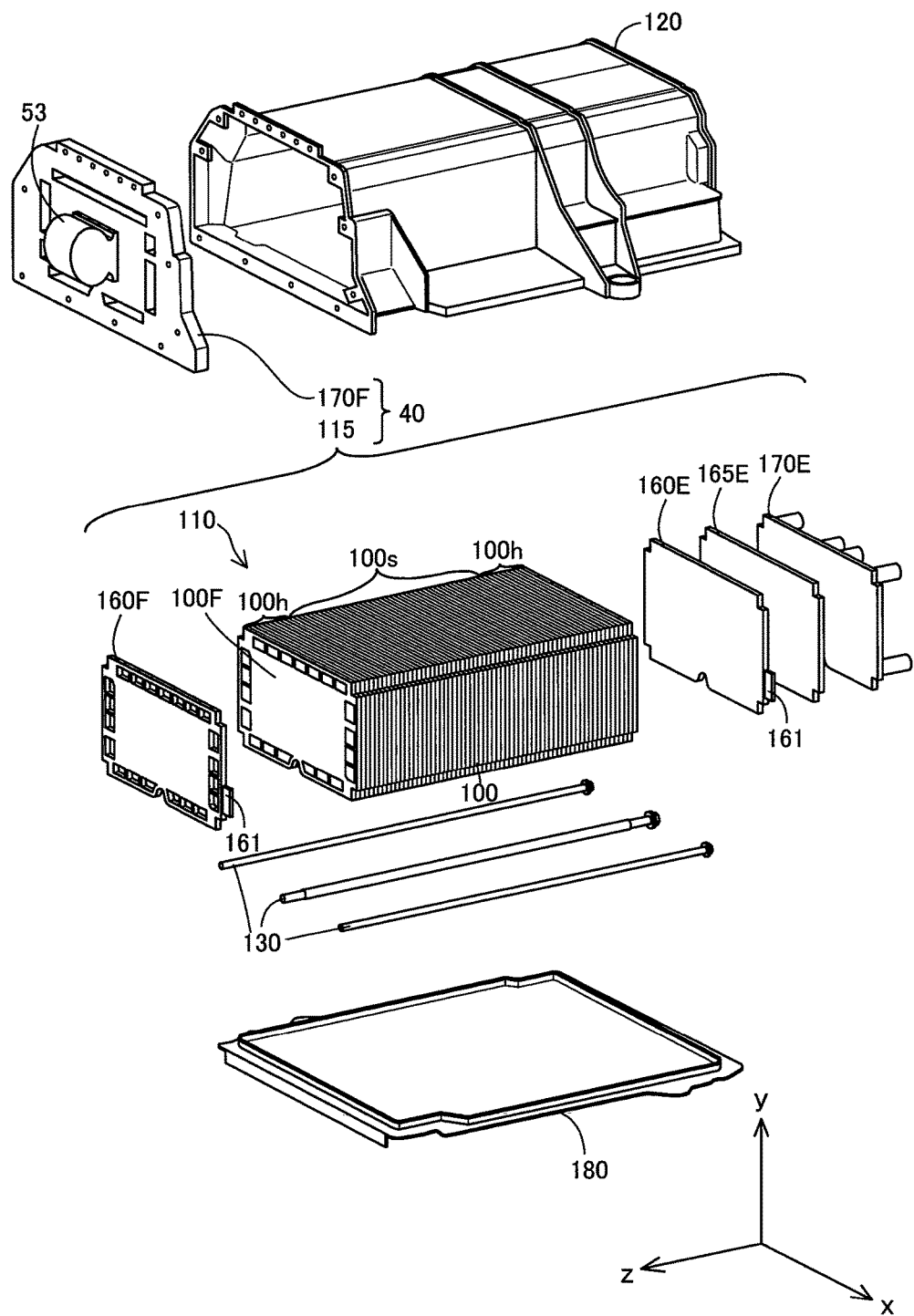
FIG. 2 is an exploded perspective view illustrating a fuel cell stack and components fixed to the fuel cell stack.

FIG. 2 is an exploded perspective view illustrating the fuel cell stack 40 and components fixed to the fuel cell stack 40 (hereinafter referred to as fixed components). All the fixed components are components included in the fuel cell system 20. The fixed components shown in the drawing include the hydrogen pump 53, a case 120, three tension shafts 130 and a cover 180. In the description below, a +z-axis side in FIG. 2 is expressed as front side, a −z-axis side is expressed as rear side, and a −y-axis side is expressed as lower side. A z-axis direction is also called stacking direction.

The fuel cell stack 40 has a layered structure in which a current collector 160F and a front end-side end plate 170F are stacked in this sequence on the front side of a stacked body 110, and a current collector 160E, an insulator plate 165E and a rear end-side end plate 170E are stacked in this sequence on the rear side of the stacked body 110. The stacked body 110 is configured by stacking a plurality of cells 100 (for example, 370 cells) in the stacking direction.

In the description below, the stacked part of the current collector 160F, the stacked body 110, the current collector 160E, the insulator plate 165E and the rear end-side end plate 170E is also called fuel cell main body 115.

The cell 100 includes an anode-side separator (not shown), a cathode-side separator (not shown) and a sealing members-integrated MEA (not shown). MEA is the acronym of membrane electrode assembly.

The cell 100 includes an anode gas supply port, an anode off-gas discharge port, six cathode gas supply ports, seven cathode off-gas discharge ports, three cooling water supply ports and three cooling water discharge ports that are provided in the periphery thereof. In the description below, these supply ports and discharge ports are collectively referred to as "supply/discharge ports".

The supply/discharge ports are connected with respective supply/discharge ports provided in the current collector 160F and the front end-side end plate 170F. When the plurality of cells 100 are stacked, these supply-discharge ports are configured to form manifolds arranged to supply hydrogen as the anode gas, the air as the cathode gas and the cooling water to the respective cells 100 and manifolds arranged to discharge an anode-off gas, a cathode-off gas and the cooling water from the respective cells 100.

Sealing portions (not shown) are formed around the respective supply/discharge ports. The presence of these sealing portions ensures the sealing properties of the manifolds between the separators and between the separators and the respective current collectors 160E and 160F when the cells 100 are stacked.

The current collector 160F and the current collector 160E are configured to collect the electric power generated by the respective cells 100 and output the collected electric power via current collecting terminals 161 to outside. The current collector 160F includes supply/discharge ports that are similar to those provided in the cell 100, in the periphery thereof. The insulator plate 165E is a resin plate having the insulation properties. The front end-side end plate 170F and the rear end-side end plate 170E are made of aluminum.

The front side of the case 120 is open as illustrated. The rear side of the case 120 is closed. The fuel cell main body 115 is placed in the case 120. The front end-side end plate 170F is fixed by means of bolts such as to close the front-side opening of the case 120. Such fixation causes the front end-side end plate 170F to be laid on the current collector 160F.

The tension shafts 130 are placed below the fuel cell main body 115. The tension shaft 130 has the front side that is connected with the front end-side end plate 170F and the rear side that is connected with an end face of the case 120. The bottom side of the case 120 is open and is closed by the cover 180 in the state that the fuel cell main body 115 is placed in the case 120.

The hydrogen pump 53 includes a motor portion and a pump portion, although not being illustrated in detail. The motor portion includes a motor and a motor housing. The pump portion includes a rotor provided to compress hydrogen. The rotor is rotated by the torque of the motor. The motor generates a torque, in response to a command from the controller 30.

The hydrogen pump 53 is fixed to the front end-side end plate 170F. In this fixed state, the motor housing of the hydrogen pump 53 is in surface contact with the front end-side end plate 170F. A heat transfer sheet (not shown) is placed between the motor housing and the front end-side end plate 170F. This configuration causes the heat generated in the motor portion to be transferred to the front end-side end plate 170F. As a result, the motor portion has approximately the same temperature as the temperature of the front end-side end plate 170F. As shown in FIG. 2, the front end-side end plate 170F has a larger surface area exposed to outside, compared with the hydrogen pump 53, and is thus likely to release heat. The front end-side end plate 170F accordingly has no significantly elevated temperature. This results in suppressing the motor portion from having an elevated temperature. The high likelihood of heat release similarly applies to the rear end-side end plate 170E.

Additionally, the front end-side end plate 170F has a large contact area with the current collector 160F and accordingly has approximately the same temperature as the temperature of the current collector 160F. Furthermore, the current collector 160F has a large contact area with a front end cell 100F and accordingly has approximately the same temperature as the temperature of the front end cell 100F. The front end cell 100F denotes one cell 100 that is arranged adjacent to and in contact with the current collector 160F.

The temperature of the front end-side end plate 170F is thus approximately equal to the temperature of the front end cell 100F. In other words, the temperature of the motor portion is approximately equal to the temperature of the front end cell 100F. Accordingly the hydrogen pump temperature is a value that reflects the temperature of a cell at an end in the stacking direction (i.e., the front end cell 100F) and is approximately equal to the temperature of the front end cell 100F. The second temperature gauge Tp is built in the motor portion and is configured to measure the temperature of the motor core. When the hydrogen pump temperature becomes equal to or higher than a predetermined reference value, the controller 30 stops the rotation of the motor, for the purpose of protecting the motor.

Each of the cells 100 is classified in either an end cell group 100h or a main cell group 100s. As shown in FIG. 2, multiple cells 100 located in the vicinity of the front end and multiple cells 100 located in the vicinity of the rear end belong to the end cell group 100h. The cells included in the end cell group 100h are also referred to as "cell located at an end in the stacking direction". The front end cell 100F belongs to the end cell group 100h. The vicinity of the front end herein means a range on the front end side of a predetermined cell 100 that is away from the front end cell 100F toward the rear end by a predetermined number of cells (for example, 10 cells). Similarly the vicinity of the rear end herein means a range on the rear end side of a predetermined cell 100 that is away from a rear end cell 100 that is located on the rearmost end toward the front end by a predetermined number of cells. The cells 100 placed between the vicinity of the front end and the vicinity of the rear end are the cells located in the middle in the stacking direction and belong to the main cell group 100s.

The measurement result (FC water temperature) of the first temperature gauge Tc configured to measure the discharge temperature of the cooling water is approximately equal to an average value of cell temperature of all the cells 100 (average cell temperature) and denotes a temperature that reflects the temperature of the fuel cell stack 40. A large majority of all the cells 100 belong to the main cell group 100s, so that the average cell temperature of all the cells 100 is approximately equal to the average cell temperature of the main cell group 100s. The FC water temperature is accordingly a value reflecting the temperature of the main cell group 100s and is approximately equal to the average cell temperature of the main cell group 100s.

Figure 3:
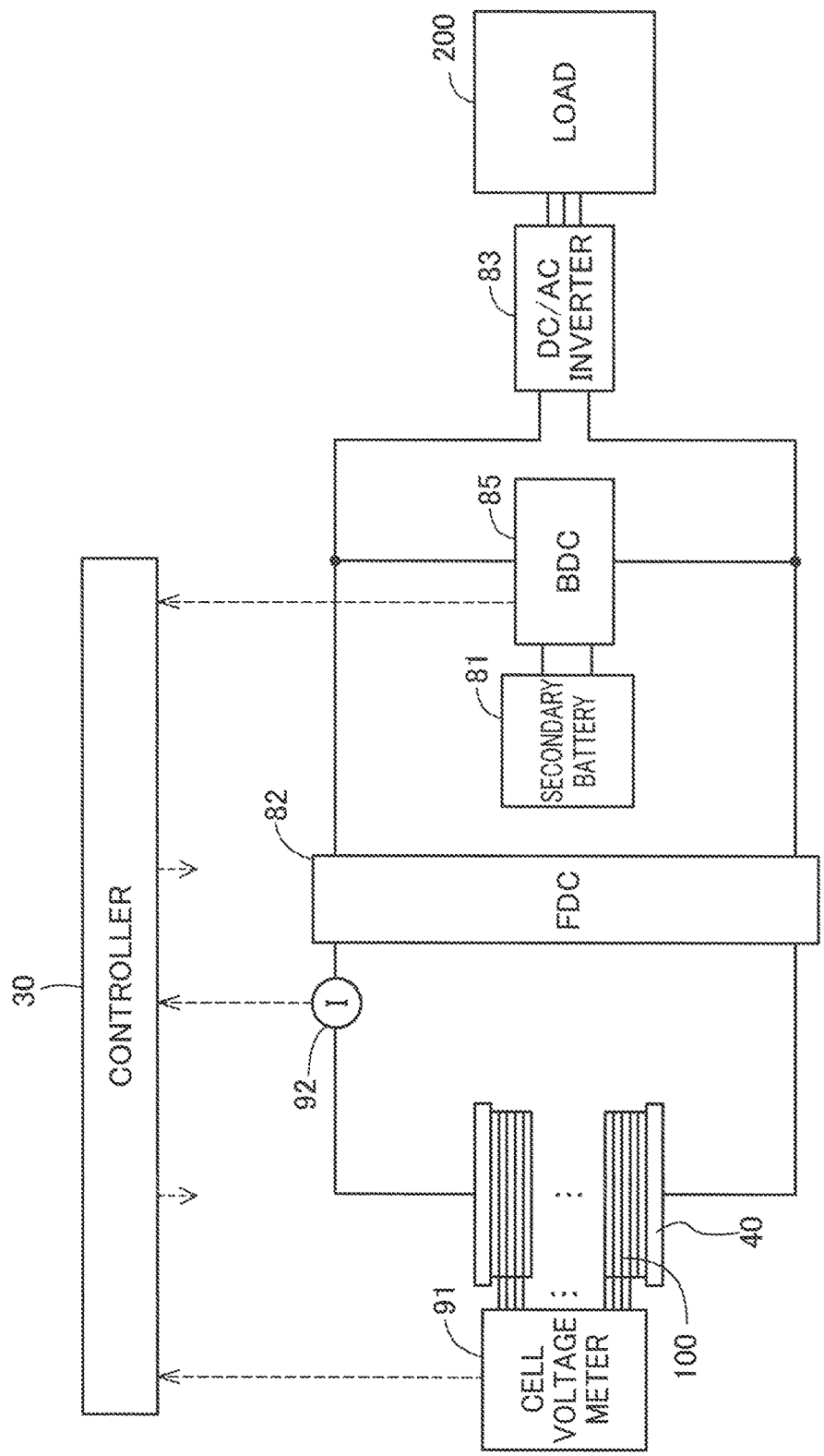
FIG. 3 is a schematic diagram illustrating the electrical configuration of the fuel cell system.

FIG. 3 is a schematic diagram illustrating the electrical configuration of the fuel cell system 20. The fuel cell system 20 includes a secondary battery 81, an FDC 82, a DC/AC inverter 83, a BDC 85, a cell voltage meter 91 and a current measurement unit 92.

According to the embodiment, the cell voltage meter 91 is connected with each of all the cells 100 included in the fuel cell stack 40 and is configured to measure the cell voltage of each of all the cells 100. The cell voltage meter 91 is configured to send the measurement results to the controller 30. The current measurement unit 92 is configured to measure the value of electric current generated by the fuel cell stack 40 and send the measurement result to the controller 30.

The FDC 82 and the BDC 85 are circuits configured as DC/DC converters. The FDC 82 is configured to control the electric current generated by the fuel cell stack 40, in response to a current command value sent from the controller 30. The current command value herein denotes a target value of electric current generated by the fuel cell stack 40 and is determined by the controller 30.

The FDC 82 serves as a power generation voltage meter and an impedance meter. The FDC 82 is configured to measure a power generation voltage by the fuel cell stack 40 and input the measurement result into the controller 30. The FDC 82 is also configured to measure an impedance of the fuel cell stack 40 and input the measurement result into the controller 30. More specifically, the FDC 82 is configured to transform the power generation voltage by the fuel cell stack 40, supply the transformed power generation voltage to the DC/AC inverter 83, measure the power generation voltage and send the measured power generation voltage to the controller 30. The FDC 82 is also configured to measure the impedance of the fuel cell stack 40 by AC impedance method. The frequency of the impedance used in this embodiment includes high frequencies and more specifically includes 100 Hz to 1 kHz.

The BDC 85 is configured to control charging and discharging of the secondary battery 81 under control of the controller 30. The BDC 85 is configured to measure the SOC (state of charge) of the secondary battery 81 and send the measured SOC to the controller 30. The secondary battery 81 is configured by, for example, a lithium ion rechargeable battery and serves as an auxiliary power supply.

The DC/AC inverter 83 is connected with the fuel cell stack 40 and a load 200. The DC/AC inverter 83 is configured to convert a DC power output from the fuel cell stack 40 and the secondary battery 81 into an AC power and supply the AC power to the load 200. The load 200 includes a motor for driving wheels that is driven with the electric power generated by the fuel cell system 20.

The regenerative power that is generated by the motor for driving wheels in the load 200 is converted into a DC current by the DC/AC inverter 83 and is accumulated in the secondary battery 81 by the BDC 85. The controller 30 calculates an output command value by taking into account the SOC of the secondary battery 81 in addition to the load 200.

The controller 30 controls the respective components described above such as to perform a temperature rise process. According to the temperature rise process, when at least one cell voltage among cell voltages of measurement object cells 100 in the fuel cell stack 40 is lower than a predetermined voltage value $V_{min}^{limit}$, the controller 30 starts temperature rising of the fuel cell stack 40. According to the temperature rise process, the controller 30 measures a time duration during which a voltage difference by subtracting at least one cell voltage among the cell voltages of the measurement object cells from an average voltage of the plurality of cells of the fuel cell stack 40 (hereinafter referred to as average voltage $V_{ave}$) is maintained to be not greater than a predetermined voltage difference $V_1$. When the measured time duration reaches a first reference time $t_{hold1}$, the controller 30 terminates the temperature rising. The controller 30 performs measurement of this time duration when at least one of time measurement conditions given below is satisfied. According to this embodiment, the time measurement conditions include the following four conditions. According to this embodiment, a lowest cell voltage among the cell voltages of the measurement object cells (hereinafter referred to as minimum voltage $V_{min}$) is used as at least one cell voltage among the cell voltages of the measurement object cells.

<First Condition>

A first condition is a condition that a predetermined time period $t_{limit1}$ has elapsed since termination of a warm-up operation that uses the heat generated in the fuel cell stack 40 to warm up the fuel cell stack 40.

When the measurement result of the ambient temperature gauge Tatm is lower than a predetermined temperature (for example, 5(° C.)), the controller 30 uses the heat generated in the fuel cell stack 40 to warm up the fuel cell stack 40. This operation is also called quick warm-up operation. The warm-up operation denotes an operation that intentionally increases a heat loss and thereby quickly warms up the fuel cell stack 40, for example, at a start time when the temperature of the fuel cell stack 40 is equal to or lower than a predetermined temperature. The warm-up operation is performed mainly at a start time prior to driving of the vehicle 1, at a stop time of the vehicle 1 or during driving of the vehicle 1. The controller 30 controls the air supply discharge mechanism 60 to decrease the amount of the air supplied to the fuel cell stack 40 and performs the warm-up operation. When the warm-up operation is terminated, the controller 30 increases the amount of the air supplied to the fuel cell stack 40, in response to a power generation request. There is accordingly a possibility that the air is not sufficiently spread over the entire fuel cell stack 40 until elapse of the predetermined time period $t_{limit1}$ since termination of the warm-up operation. The minimum voltage $V_{min}$ is thus more likely to be lowered.

<Second Condition>

A second condition is a condition that a predetermined time period $t_{limit2}$ has elapsed since termination of an intermittent operation that is performed to temporarily stop power generation by the fuel cell system 20.

The intermittent operation temporarily stops power generation by the fuel cell system 20. More specifically, the intermittent operation temporarily stops power generation by the fuel cell system 20 during a low-load operation such as during idling or during low-speed driving, such as to supply electric power from the secondary battery 81 to the load 200 (driving motor) in the vehicle 1 equipped with the fuel cell system 20. During the intermittent operation, a power generation request to the fuel cell system 20 is zero. During the intermittent operation, the controller 30 sends a signal to the motor for flow dividing valve 64 to control the flow dividing valve 63 such as to flow the air toward the bypass flow path 69. When the intermittent operation is terminated, the controller 30 controls the flow dividing valve 63 in response to a power generation request, such as to supply the air from the air supply flow path 61 to the fuel cell stack 40. There is accordingly a possibility that the air is not sufficiently spread over the entire fuel cell stack 40 until elapse of the predetermined time period $t_{limit2}$ since termination of the intermittent operation. The minimum voltage $V_{min}$ is thus more likely to be lowered.

<Third Condition>

A third condition is a condition that a predetermined time period $t_{limit3}$ has elapsed since termination of regenerative braking that regenerates electric power generated by a driving motor included in the vehicle 1 equipped with the fuel cell system 20, such as to be used as the braking force of the vehicle 1.

The regenerative braking denotes a control of regenerating the electric power generated by the driving motor (load 200) included in the vehicle 1 equipped with the fuel cell system 20, such as to be used as the braking force of the vehicle 1. The fuel cell system 20 is configured such that a regenerative power generated by the regenerative braking is accumulated in the secondary battery 81 via the DC/AC inverter 83. In the regenerative braking, a difference by subtracting a chargeable electric power accumulated in the secondary battery 81 from a regenerative power generated by the load 200 is a surplus power. The surplus power is consumed by auxiliary machines (not shown) and is also consumed by, for example, driving the compressor 62 or the hydrogen pump 53 up to a maximum rotation speed. During the regenerative braking, a power generation request to the fuel cell system 20 is zero. During the regenerative braking, the controller 30 sends a signal to the motor for flow dividing valve 64 to control the flow dividing valve 63 such as to flow the air toward the bypass flow path 69. When the regenerative braking is terminated, the controller 30 controls the flow dividing valve 63 in response to a power generation request, such as to supply the air from the air supply flow path 61 to the fuel cell stack 40. There is accordingly a possibility that the air is not sufficiently spread over the entire fuel cell stack 40 until elapse of the predetermined time period $t_{limit3}$ since termination of the regenerative braking. The minimum voltage $V_{min}$ is thus more likely to be lowered.

<Fourth Condition>

A fourth condition is a condition that a predetermined time period $t_{limit4}$ has elapsed since a shift of the state of the fuel cell stack 40 to a power generation capable state after a start of the fuel cell system 20.

The fuel cell system 20 is started in response to an ON operation of the power switch 5. The air is not supplied to the fuel cell stack 40 immediately after a start of the fuel cell system 20. In response to a power generation request to the fuel cell system 20 after the start, the fuel cell system 20 starts supplying the air to the fuel cell stack 40, such as to start power generation. This state is expressed as a shift of the operation state of the fuel cell system 20 from a starting operation to an ordinary operation. The starting operation denotes an operation to start the respective components of the fuel cell system 20 after an ON operation of the power switch 5. The ordinary operation denotes an operation other than the starting operation and a stop operation. The stop operation denotes an operation to stop the operation of the fuel cell system 20 after an OFF operation of the power switch 5. There is a possibility that the air is not sufficiently spread over the entire fuel cell stack 40 until elapse of the predetermined time period $t_{limit4}$ since a shift of the state of the fuel cell stack 40 to the power generation capable state after a start of the fuel cell system 20, i.e., a shift from the starting operation to the ordinary operation. The minimum voltage $V_{min}$ is thus more likely to be lowered.

According to this embodiment, the predetermined time period $t_{limit1}$ in the first condition is a time period in a range of "1 (sec)≤$t_{limit1}$≤5 (sec)". The predetermined time period $t_{limit2}$ in the second condition is a time period in a range of "1 (sec)≤$t_{limit2}$≤5 (sec)". The predetermined time period $t_{limit3}$ in the third condition is a time period of "1 (sec)≤$t_{limit3}$≤5 (sec)". The predetermined time period $t_{limit4}$ in the fourth condition is a time period in a range of "1 (sec)≤$t_{limit4}$≤5 (sec)".

A2. Temperature Rise Process

Figure 4:
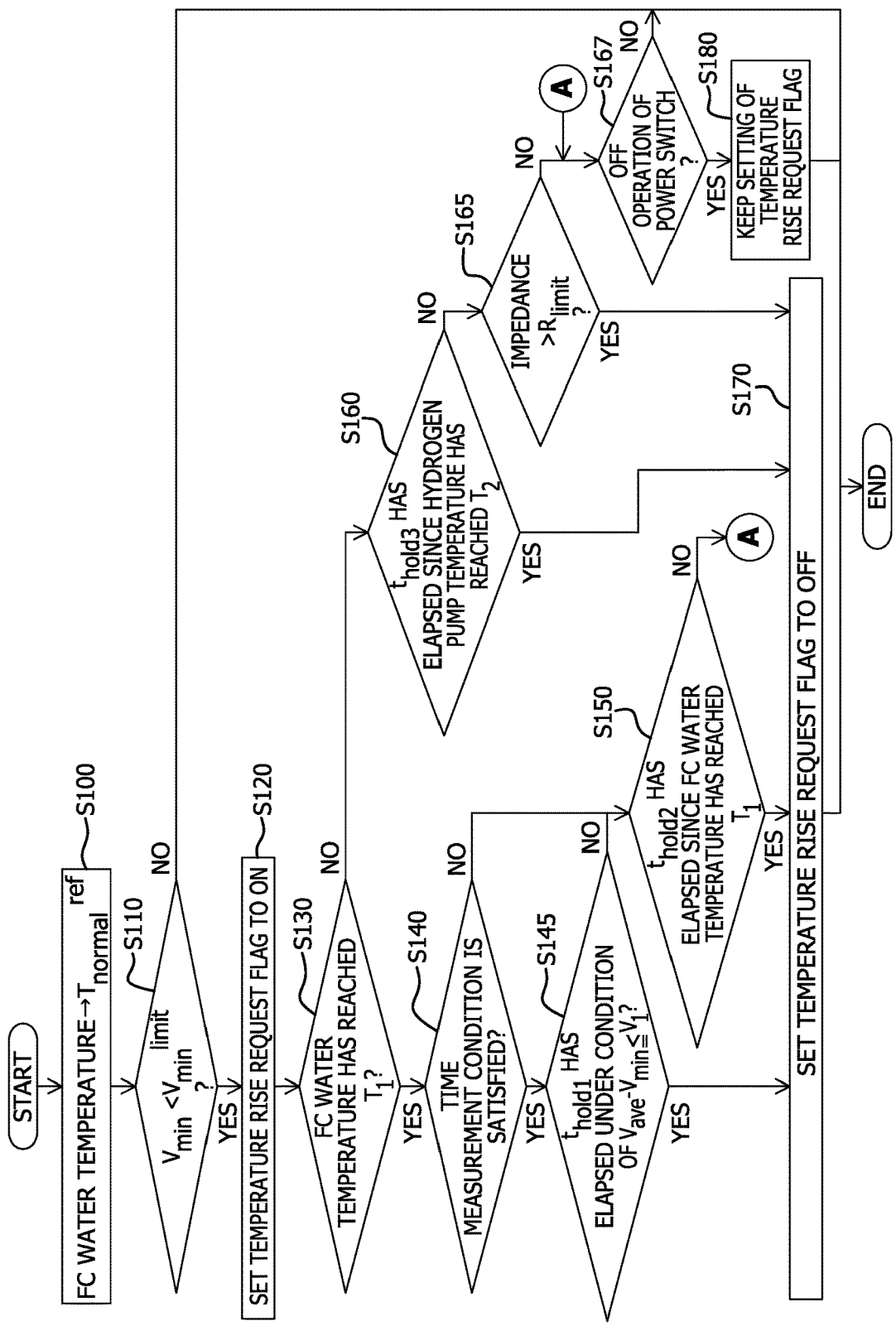
FIG. 4 is a flowchart showing a temperature rise process.

FIG. 4 is a flowchart showing the temperature rise process. The controller 30 stores a program for the temperature rise process in a storage medium such as a built-in memory and executes this program to perform the temperature rise process. An ON operation of the power switch 5 triggers the temperature rise process by the controller 30.

In response to an ON operation of the power switch 5, the controller 30 controls the cooling water circulation mechanism 70 such that the first temperature value reaches an ordinary temperature $T_{normal}^{ref}$ (step S100). According to this embodiment, the first temperature value is the FC water temperature, and the ordinary temperature $T_{normal}^{ref}$ is a temperature in a range of "50(° C.)≤$T_{normal}^{ref}$≤70(° C.)". The ordinary temperature $T_{normal}^{ref}$ denotes a command temperature of cooling water when the controller 30 causes the fuel cell stack 40 to perform power generation in response to a power generation request.

The controller 30 subsequently determines whether the minimum voltage ($V_{min}$) is lower than a predetermined voltage value $V_{min}^{limit}$ (step S110). This step S110 determines whether a flooding occurs in the measurement object cells 100. The predetermined voltage value $V_{min}^{limit}$ is a voltage value, for example, in a range of "−0.1 (V)≤ $V_{min}^{limit}$<0 (V)".

When the minimum voltage $V_{min}$ is lower than the predetermined voltage value $V_{min}^{limit}$ (step S110: YES), the controller 30 sets a temperature rise request flag to ON (step S120). Setting the temperature rise request flag to ON means changing the temperature rise request flag to ON when the temperature rise request flag is OFF and keeping the temperature rise request flag ON when the temperature rise request flag is ON. When the temperature rise request flag is set to ON, the controller 30 controls the cooling water circulation mechanism 70 such that the FC temperature reaches a first reference temperature $T_1$. The first reference temperature $T_1$ is a temperature higher than the ordinary temperature $T_{normal}^{ref}$ and denotes a predetermined temperature in order to dry the cell 100 where the flooding occurs in the fuel cell stack 40. According to this embodiment, the first reference temperature $T_1$ is a temperature in a range of "$T_{normal}^{ref}$<$T_1$≤$T_{normal}^{ref}$+10(° C.)".

After setting the temperature rise request flag to ON, the controller 30 determines whether the FC water temperature has reached the first reference temperature $T_1$ (step S130). When the FC water temperature has reached the first reference temperature $T_1$ (step S130: YES), the controller 30 subsequently determines whether at least one of the time measurement conditions is satisfied (step S140).

When at least one of the time measurement conditions is satisfied (step S140: YES), the controller 30 measures a time duration during which a voltage difference (average voltage $V_{ave}$−minimum voltage $V_{min}$) by subtracting the minimum voltage $V_{min}$ from an average voltage $V_{ave}$ is maintained to be not greater than a predetermined voltage difference $V_1$ and determines whether the measured time duration has reached a first reference time $t_{hold1}$ (step S145). According to this embodiment, the controller 30 calculates the average voltage $V_{ave}$ by dividing the power generation voltage by the number of the cells 100. The predetermined voltage difference $V_1$ denotes a voltage difference that allows for determination that the flooding is eliminated. According to this embodiment, the predetermined voltage difference $V_1$ is a value in a range of "0 (V)<$V_1$≤0.5 (V)". The first reference time $T_{hold1}$ denotes a time period to sufficiently dry the cell 100 where the flooding occurs. According to this embodiment, the first reference time $t_{hold1}$ is a time period in a range of "1 (min)≤$t_{hold1}$≤5 (min)".

When at least one of the time measurement conditions is satisfied (step S140: YES) and the time duration during which the voltage difference is maintained to be not greater than the predetermined voltage difference $V_1$ has reached the first reference time $t_{hold1}$ (step S145: YES), the controller 30 sets the temperature rise request flag to OFF (step S170) and terminates the temperature rise process.

When either the determination of step S140 or the determination of step S145 is NO, the controller 30 subsequently determines whether a second reference time $t_{hold2}$ has elapsed since the FC water temperature has reached the first reference temperature $T_1$ (step S150). The second reference time $t_{hold2}$ is a time period longer than the first reference time $t_{hold1}$. The second reference time $t_{hold2}$ denotes a predetermined time period that suppresses the fuel cell stack 40 from being excessively dried by controlling the FC water temperature to the first reference temperature $T_1$ after the FC water temperature has reached the first reference temperature $T_1$. According to this embodiment, the second reference time $t_{hold2}$ is a time period in a range of "$t_{hold1}$<$t_{hold2}$≤$t_{hold1}$+ 10 (min)". When the second reference time $t_{hold2}$ has elapsed (step S150: YES), the controller 30 sets the temperature rise request flag to OFF (step S170).

When the FC temperature has not yet reached the first reference temperature $T_1$ (step S130: NO), on the other hand, the controller 30 subsequently determines whether a third reference time $t_{hold3}$ has elapsed since the second temperature value has reached a second reference temperature $T_2$ (step S160). According to this embodiment, the second temperature value is the hydrogen pump temperature. According to this embodiment, the second reference temperature $T_2$ is a temperature lower than the first reference temperature $T_1$ and denotes a predetermined temperature in order to dry the cell 100 located at an end in the stacking direction. According to this embodiment, the second reference temperature $T_2$ is a temperature in a range of "$T_{normal}^{ref}-30 \leq T_2 \leq T_{normal}^{ref}-10$". According to this embodiment, the third reference time $t_{hold3}$ is a time period in a range of "1 (min) $\leq t_{hold3} \leq 5$ (min)" and is a time period in the same range as that of the first reference time $t_{hold1}$. The hydrogen pump temperature is approximately equal to the cell temperature of the front end cell 100F as described above. Accordingly the state that the hydrogen pump temperature has reached the second reference temperature $T_2$ indicates a high possibility that the cell temperature of the front end cell 100F has reached the second reference temperature $T_2$. When the third reference time $t_{hold3}$ has elapsed (step S160: YES), there is accordingly a high possibility that the front end cell 100F has been warmed up and the flooding occurring in the front end cell 100F is eliminated. When the third reference time $t_{hold3}$ has elapsed (step S160: YES), the controller 30 sets the temperature rise request flag to OFF (step S170).

When the third reference time $t_{hold3}$ has not elapsed since the hydrogen pump temperature has reached the second reference temperature $T_2$ (step S160: NO), on the other hand, the controller 30 subsequently determines whether the impedance of the fuel cell stack 40 is higher than a predetermined value (impedance upper limit value) $R_{limit}$ (step S165). According to this embodiment, the predetermined value $R_{limit}$ is a value of not less than 1.1 times as high as an impedance value $R_{base}$. The impedance value $R_{base}$ denotes a value measured in advance when the fuel cell stack 40 is in a full wet state. The full wet state denotes a state that there is no dryness in a plane of the cell 100. The impedance $R_{base}$ may be, for example, an impedance of the fuel cell stack 40 measured when the fuel gas and the oxidizing gas of the humidity of 100% are supplied into the fuel cell stack 40. This value suggests a high possibility that the cell 100 is dried. When the impedance is higher than the predetermined value $R_{limit}$ (step S165: YES), the controller 30 sets the temperature rise request flag to OFF (step S170).

When the impedance is not higher than the predetermined value $R_{limit}$ (step S165: NO) or when the second reference time $t_{hold2}$ has not yet elapsed since the FC water temperature has reached the first reference temperature $T_1$ (step S150: NO), the controller 30 subsequently determines whether an OFF operation of the power switch 5 is provided (step S167). When an OFF operation of the power switch 5 is provided (step S167: YES), the controller 30 keeps the setting of the temperature rise request flag (step S180) and terminates the temperature rise process. More specifically, when an OFF operation of the power switch 5 is provided before the temperature rise request flag that has been set to ON (step S120) is changed to OFF (step S170), the controller 30 keeps the temperature rise request flag ON and stops the fuel cell system 20. In response to a subsequent ON operation of the power switch 5, the controller 30 accordingly controls the cooling water circulation mechanism 70 such that the FC water temperature reaches the first reference temperature $T_1$.

When the minimum voltage $V_{min}$ is not lower than the predetermined voltage value $V_{min}^{limit}$ (step S110: NO) or when no OFF operation of the power switch 5 is provided (step S167: NO), the controller 30 terminates the temperature rise process.

A3. Advantageous Effects

In a fuel cell system, a controller may be configured to determine the occurrence of flooding and start a temperature rise to increase the temperature of a fuel cell when the minimum voltage $V_{min}$ is not higher than a predetermined voltage. In this configuration, when a difference by subtracting the minimum voltage $V_{min}$ from the average voltage $V_{ave}$ becomes equal to or less than a predetermined voltage difference, the controller may determine that the flooding is eliminated and terminate the temperature rise. In order to definitely dry the cell where the flooding occurs in a fuel cell stack, for example, the controller may measure a time duration during which the difference by subtracting the minimum voltage $V_{min}$ from the average voltage $V_{ave}$ is maintained to be not greater than the predetermined voltage difference and may terminate the temperature rise when the measured time duration has reached a predetermined time period. The cell voltage is, however, likely to be decreased due to a reason other than the flooding, for example, due to an insufficient supply of the cathode gas to the fuel cell stack. More specifically, the minimum voltage may become equal to or lower than a predetermined voltage, while the difference by subtracting the minimum voltage $V_{min}$ from the average voltage $V_{ave}$ is maintained to be not greater than the predetermined voltage difference (during measurement of the time duration) in the course of the temperature rise. In this case, the controller may determine the occurrence of flooding again, reset the measured time duration, newly start measuring a time duration during which the difference by subtracting the minimum voltage from the average voltage is maintained to be not greater than the predetermined voltage difference, and terminate the temperature rise when the measured time duration has reached the predetermined time period. This is likely to cause the cell to be excessively dried.

In the fuel cell system 20 of the embodiment described above, however, when at least one of the plurality of time measurement conditions is satisfied, the controller 30 is configured to measure the time duration during which the voltage difference by subtracting at least one cell voltage among the cell voltages of the measurement object cells 100 from the average voltage $V_{ave}$ of the plurality of cells 100 is maintained to be not greater than the predetermined voltage difference $V_1$, in order to terminate the temperature rise. Otherwise the controller 30 does not measure the time duration. This configuration enables the time duration for termination of the temperature rise to be measured appropriately and thereby suppresses the cell 100 from being excessively dried by the temperature rise of the fuel cell stack 40. As a result, this suppresses the MEA of the cell 100 from being dried and deteriorated.

According to the embodiment, even when the time duration for termination of the temperature rise measured after the start of the temperature rise has not yet reached the first reference time $t_{hold1}$, the controller 30 controls the cooling water circulation mechanism 70 to terminate the temperature rise upon condition that the second reference time $t_{hold2}$ longer than the first reference time $t_{hold1}$ has elapsed since the first temperature value has reached the first reference temperature $T_1$. This configuration suppresses the cell 100 from being excessively dried by extending the temperature rise time, for example, when none of the time measurement conditions is satisfied or when at least one of the time measurement conditions is satisfied but the voltage difference by subtracting the minimum voltage $V_{min}$ from the average voltage $V_{ave}$ does not become equal to or less than the predetermined voltage difference $V_1$.

According to the embodiment, the cell voltage meter 91 is configured to measure the cell voltages of all the cells 100. The cell voltage of the cell 100 located at an end in the stacking direction (i.e., the cell included in the end cell group 100$h$) is also input into the controller 30. The cell 100 located at an end in the stacking direction has the lower temperature than the other cells 100 and is thus more likely to decrease the voltage with the occurrence of flooding than the other cells 100. The controller 30 starts the temperature rise when the minimum voltage $V_{min}$ is equal to or lower than the predetermined voltage value. The controller 30 then measures the time duration during which the voltage difference (average voltage $V_{ave}$–minimum voltage $V_{min}$) is maintained to be not greater than the predetermined voltage difference $V_1$ and terminates the temperature rise based on the measurement result. This configuration effectively eliminates the flooding.

According to the embodiment, the controller 30 terminates the temperature rise when the first temperature value is lower than the first reference temperature $T_1$ and the impedance is higher than the predetermined value $R_{limit}$. This configuration suppresses the cell 100 from being excessively dried by the temperature rise.

According to the embodiment, the hydrogen pump 53 is mounted to the end plate, so that the second temperature value measured by the second temperature gauge Tp that is configured to measure the temperature of the hydrogen pump 53 reflects the temperature of the cell 100 at an end in the stacking direction of the fuel cell stack 40. Even when the first temperature value reflecting the temperature of the fuel cell stack 40 is lower than the first reference temperature $T_1$, the controller 30 terminates the temperature rise upon condition that the third reference time $t_{hold3}$ has elapsed since the second temperature value reflecting the temperature of the cell 100 at an end in the stacking direction where the flooding is more likely to occur has reached the second reference temperature $T_2$ lower than the first reference temperature $T_1$. This configuration more effectively suppresses the cell 100 from being excessively dried. Additionally, this configuration does not require a temperature gauge separately provided for measuring the temperature of the cell 100 at an end in the stacking direction. This results in simplifying the configuration of the fuel cell system 20.

According to the embodiment, when an OFF operation of the power switch 5 is provided before the temperature rise flag that has been set to ON is changed to OFF, the controller 30 keeps the temperature rise request flag ON and stops the fuel cell system 20. Even when the flooding is not sufficiently eliminated this time for a time period between an ON operation of the power switch 5 and an OFF operation of the power switch 5, this configuration provides the chance to eliminate the flooding at the time of a next ON operation of the power switch 5.

Repeating the operation with an OFF operation of the power switch OFF or repeating the low load operation in the state that warm-up of the main cell group 100$s$ has been completed but warm-up of the end cell group 100$h$ has not yet been completed is likely to increase the amount of water accumulated especially in the cell 10 included in the end cell group 100$h$, is likely to accumulate water in the hydrogen supply discharge mechanism 50, and is thereby likely to generate a negative voltage due to deficiency of hydrogen. The configuration of the embodiment, however, regulates the amount of water accumulated in the cell 100 to an adequate amount and suppresses the cell 100 from being excessively dried.

B. Modifications

B1. Modification 1

According to a modification of the embodiment described above, the controller 30 may determine whether the minimum voltage $V_{min}$ is lower than the predetermined voltage value $V_{min}^{limit}$ with skipping the step of controlling the cooling water circulation mechanism 70 such that the FC water temperature reaches the ordinary temperature $T_{normal}^{ref}$ (step S100). According to another modification, when step S100 is performed, the controller 30 may control the cooling water circulation mechanism 70 such that the FC water temperature reaches another temperature out of the range of "50(° C.)≤$T_{normal}^{ref}$≤70(° C.)".

B2. Modification 2

According to a modification of the embodiment described above, the controller 30 may determine whether a precondition for determination is satisfied before controlling the cooling water circulation mechanism 70 such that the FC water temperature reaches the ordinary temperature $T_{normal}^{ref}$ (step S100) and subsequently determining whether the minimum voltage $V_{min}$ is lower than the predetermined voltage value $V_{min}^{limit}$ (step S110). In this modification, the controller 30 may be configured to shift the flow of the temperature rise process to step S110 when the precondition is satisfied and terminate the temperature rise process when the precondition is not satisfied. The following gives some examples of the precondition.

<Precondition 1>

Precondition 1 is conditions that the fuel cell system 20 is in the ordinary operation other than the starting operation and the stop operation and that a predetermined time period has elapsed since termination of the quick warm-up operation.

This configuration suppresses the determination of whether the minimum voltage $V_{min}$ is lower than the predetermined voltage value $V_{min}^{limit}$ (setting of the temperature rise request flag to ON) and the setting of the temperature rise request flag to OFF (steps S110 to S180) from interfering with a process performed at a starting operation of the fuel cell system 20 or a process performed at a stop operation.

<Precondition 2>

Precondition 2 is a condition that the present time is not winter.

In the precondition 2, the controller 30 determines that the present time is winter when the measurement result of the ambient temperature gauge Tatm is lower than a predetermined temperature (for example, 5(° C.)) and determines that the present time is not winter when the measurement result is not lower than the predetermined temperature. In the winter, cathode water (i.e., water present in the cathode flow path in each of the cells 100) is likely to be frozen during parking. It is accordingly preferable to increase the temperature of the fuel cell stack 40 to be higher than the first reference temperature $T_1$ in the temperature rise process described above. The controller 30 may be configured to shift the flow of the temperature rise process to step S110 when the precondition 2 is satisfied. This configuration suppresses the setting of the temperature rise request flag to ON and the setting of the temperature rise request flag to OFF (steps S110 to S180) from interfering with the process when the present time is winter. According to another modification, the controller 30 may be configured to store, for example, the dates specified as winter and the dates specified as not winter and determine that the present time is not winter, based on the measurement result of a real time clock provided in the vehicle 1.

The controller 30 may be configured to shift the flow of the temperature rise process to step S110 when at least one of the preconditions described above is satisfied or may be configured to shift the flow of the temperature rise process to step S110 when both the preconditions are satisfied.

B3. Modification 3

The predetermined voltage value $V_{min}^{limit}$ used at step S110 according to the embodiment described above may be a voltage value out of the range of "$-0.1\ (V) \le V_{min}^{limit} < 0\ (V)$". The predetermined voltage value $V_{min}^{limit}$ may be another voltage value at which flooding is likely to occur, for example, another negative voltage value.

According to the embodiment described above, the controller 30 determines whether the minimum voltage $V_{min}$ is lower than the predetermined voltage value $V_{min}^{limit}$ at step S110. According to a modification, the controller 30 may be configured to determine whether at least one cell voltage among the cell voltages of the measurement object cells 100 is lower than the predetermined voltage value $V_{min}^{limit}$. For example, the controller 30 may be configured to determine whether an average value of the lowest cell voltage and the second lowest cell voltage among the cell voltages of the measurement object cells 100 is lower than the predetermined voltage value $V_{min}^{limit}$.

B4. Modification 4

The first reference temperature $T_1$ used at step S130 according to the embodiment described above is a temperature in the range of "$T_{normal}^{ref} < T_1 \le T_{normal}^{ref} + 10(°\ C.)$". According to a modification, the first reference temperature $T_1$ may be a temperature, for example, in a range of 50(° C.) to 70(° C.). This configuration suppresses the MEA of the cell 100 from being dried and deteriorated. According to another modification, the first reference temperature $T_1$ may be a temperature in a range of 55(° C.) to 65(° C.). This configuration enables only water present in the flow path included in the cell 100 to be removed and thereby more effectively suppresses the MEA of the cell 100 from being dried and deteriorated.

B5. Modification 5

According to the embodiment described above, the "predetermined time period" $t_{limit1}$ ($t_{limit2}$, $t_{limit3}$, or $t_{limit4}$)" in each of the time measurement conditions of step S140 is the time period in the range of "1 (sec) $\le t_{limit1} \le$ 5 (sec)". According to a modification, the "predetermined time period" in each of the time measurement conditions may be a time period until the air is spread over in the fuel cell stack 40. The "time period until the air is spread over in the fuel cell stack 40" may be, for example, a time period until the air flowing from the air supply flow path 61 into the fuel cell stack 40 is discharged from the air discharge flow path 66. The "predetermined time period" in each of the time measurement conditions may be, for example, a time period that is equal to or longer than a time period until the controller 30 controls the flow dividing valve 63 to change over the flow direction of the air from the bypass flow path 69-side toward the fuel cell stack 40-side and cause the air to be spread from the position of connection of the air supply flow path 61 and the bypass flow path 69 over into the fuel cell stack 40. This configuration may cause the controller 30 to measure the time duration for termination of the temperature rise when the time period until the cathode gas is spread over into the fuel cell stack 40 has elapsed and otherwise cause the controller 30 not to measure the time duration. This configuration thus more effectively suppresses the fuel cell stack 40 from being excessively dried.

The "predetermined time period" in each of the time measurement conditions may be determined according to the dimension of the fuel cell stack 40, for example, the length in the stacking direction. The "predetermined time period" in each of the time measurement conditions may be a time period required to change over the flow pathway of the flow dividing valve 63 by the motor for flow dividing valve 63. The "predetermined time period" in each of the time measurement conditions may be a time period out of the range of "1 (sec) $\le t_{limit1} \le$ 5 (sec)". The "predetermined time period" may be, for example, 0.5 seconds, 6 seconds, 7 second or 8 seconds or may be, for example, any time duration between 0.5 seconds and 1 second or any time duration between 5 seconds and 7 seconds (for example, 5.5 seconds).

The "predetermined time period" may be identical in at least two time measurement conditions or may be identical in all the time measurement conditions. The respective time measurement conditions may employ different predetermined time periods.

B6. Modification 6

According to a modification of the embodiment, the controller 30 may determine whether all the time measurement conditions 1 to 4 are satisfied at step S140. This configuration may cause the controller 30 to measure the time duration for termination of the temperature rise when all the plurality of time measurement conditions are satisfied and otherwise cause the controller 30 not to measure the time duration. This configuration enables measurement of the time duration for termination of the temperature rise to be performed more appropriately and thereby more effectively suppresses the cell 100 from being excessively dried.

B7. Modification 7

According to the embodiment described above, the predetermined voltage difference $V_1$ used at step S145 is a value in the range of "0 (V) < $V_1 \le$ 0.5 (V)". According to a modification, this voltage difference $V_1$ may be a value in another range, for example, a value of not higher than 0.5 (V) or a value of not higher than 0.6 (V). According to the embodiment described above, the first reference time $t_{hold1}$ used at step S145 is a time period in the range of "1 (min) $\le t_{hold1} \le$ 5 (min)". According to a modification, this first reference time $t_{hold1}$ may be another value, for example, another value in a range between 1 minute and 10 minutes.

B8. Modification 8

According to the embodiment described above, the second reference time $t_{hold2}$ used at step S150 is a time period in the range of "$t_{hold1} < t_{hold2} \le t_{hold1} + 10$ (min)". For example, the second reference time $t_{hold2}$ may be a time period of shorter than 30 minutes. In another example, the second reference time $t_{hold2}$ may be a time period of shorter than 15 minutes. This suppresses the MEA of the cell 100 from being dried and deteriorated. In terms of eliminating the flooding, the second reference time $t_{hold2}$ is more preferably not shorter than 5 minutes. According to a modification, the second reference time $t_{hold2}$ may be equal to the first reference time $t_{hold1}$.

According to another modification, the controller 30 may not perform the processing of step S150. In this modification, the controller 30 may terminate the temperature rise process when either the condition of step 140 or the condition of step S145 is not satisfied.

B9. Modification 9

According to a modification of the embodiment described above, at step S160, the controller 30 may measure the time duration upon satisfaction of the conditions that the FC water temperature has reached the second reference temperature $T_2$ and that the fuel cell system 20 is in the ordinary operation, in addition to the condition that the hydrogen pump temperature has reached the second reference temperature $T_2$ and may determine whether the measured time duration has reached the third reference time $t_{hold3}$. This modification also allows for determination of whether the front end cell 100F where the flooding is more likely to occur than the other cells has been warmed up, or in other words, determination of whether the flooding is eliminated in the front end cell 100F, even when the FC water temperature has not yet reached the first reference temperature $T_1$ (step S130: NO).

According to the embodiment described above, the second reference temperature $T_2$ used at step S160 is a temperature lower than the first reference temperature $T_1$. According to a modification, the second reference temperature $T_2$ may be not necessarily lower than the first reference temperature $T_1$ but may be equal to or higher than the first reference temperature $T_1$. According to the embodiment described above, the second reference temperature $T_2$ used at step S160 is a temperature in the range of "$T_{normal}^{ref}-30 \leq T_2 \leq T_{normal}^{ref}-10$". According to a modification, the second reference temperature $T_2$ may be a temperature in another range. According to a modification, the third reference time $t_{hold3}$ used at step S160 may not be necessarily a time period in the same range as that of the first reference time $t_{hold1}$. The third reference time $t_{hold3}$ may be a time period out of the range of "1 (min)$\leq t_{hold3} \leq$5 (min)". The third reference time $t_{hold3}$ may be equal to the second reference time $t_{hold2}$.

According to another modification, the controller 30 may not perform the processing of step S160. In this modification, the controller 30 may terminate the temperature rise process when the condition of step S130 is not satisfied.

B10. Modification 10

According to a modification of the embodiment described above, the predetermined value of impedance $R_{limit}$ used at step S165 may be not necessarily a value of not less than 1.1 times as high as the impedance value $R_{base}$ in the full wet state of the fuel cell stack 40 but may be another value that allows for determination that the cell 100 is more likely to be dried.

According to another modification of the embodiment described above, the controller 30 may not perform the processing of step S165. In this modification, the controller 30 may terminate the temperature rise process when the condition of step S160 is not satisfied.

B11. Modification 11

According to the embodiment described above, the first temperature gauge Tc is the water temperature gauge Tc configured to measure the discharge temperature of cooling water, and the first temperature value denotes the temperature of cooling water. According to a modification, the fuel cell system 20 may include a temperature gauge configured to measure the temperature of any of the cells 100 belonging to the main cell group 100s, as the first temperature gauge Tc. The fuel cell system 20 may use the temperature of any of the cells 100 belonging to the main cell group 100s as the first temperature value or may use an average temperature of multiple cells 100 included in the main cell group 100<i>2</i> as the first temperature value. According to another modification, the fuel cell system 20 may include a temperature gauge configured to measure the temperatures of all the cells 100, and an average temperature of all the cells 100 may be used as the first temperature.

B12. Modification 12

According to the embodiment described above, the second temperature gauge Tp is the temperature gauge Tp configured to measure the temperature of the hydrogen pump 53, and the second temperature value denotes the hydrogen pump temperature. According to a modification, the fuel cell system 20 may include a separate temperature gauge configured to measure the temperature of the cell located at an end in the stacking direction (end cell group 100h). For example, a temperature gauge may be provided in one certain cell 100 belonging to the end cell group 100h. In another example, a temperature gauge may be provided to measure the temperature of the current collector 160F on the front end side or the current collector 160E on the rear end side or the temperature of the front end-side end plate 170F or the rear end-side end plate 170E. In such a modification, even when the first temperature value reflecting the temperature of the fuel cell stack 40 is lower than the first reference temperature $T_1$, the controller 30 terminates the temperature rise upon condition that the third reference time $t_{hold3}$ has elapsed since the second temperature value reflecting the temperature of the cell 100 at an end in the stacking direction where the flooding is more likely to occur has reached the second reference temperature $T_2$ lower than the first reference temperature $T_1$. This configuration more effectively suppresses the cell 100 from being excessively dried.

According to another modification, the fuel cell system 20 may not include the second temperature gauge Tp.

B13. Modification 13

According to the embodiment described above, the controller 30 controls the flow dividing valve 73 of the cooling water circulation mechanism 70 to flow the cooling water to the bypass flow path 79, such as to increase the FC water temperature. According to a modification, the controller 30 may regulate the amount of cooling water supplied to the fuel cell stack 40, such as to increase the FC water temperature. According to another modification, the fuel cell system 20 may include a humidifier configured to humidify the cathode gas. In this modification, the controller 30 may control the humidifier to increase the temperature of the fuel cell stack 40. According to another modification, the controller 30 may increase the temperature of the fuel cell stack 40 by any of combinations thereof.

F14. Modification 14

The cell voltage meter 91 may not necessarily measure the cell voltages of all the cells 100. In a modification that the cell voltages of all the cells 100 are not measured, the cell voltage meter 91 is preferably configured to measure the cell voltage of the cell 100 located at an end in the stacking direction (end cell group 100h). The cell 100 located at an end in the stacking direction has the lower temperature than the other cells 100 and is thus more likely to cause flooding than the other cells 100. According to this modification, the controller 30 may start the temperature rise when the voltage of the cell 100 located at an end in the stacking direction where the flooding is more likely to occur is equal to or lower than the predetermined voltage value. The controller 30 may then measure the time duration during which the voltage difference (average voltage $V_{ave}$-cell voltage of the cell located at an end (minimum voltage $V_{min}$)) is maintained to be not greater than the predetermined voltage difference $V_1$ and terminates the temperature rise based on the measurement result. This modified configuration also effectively eliminates the flooding.

F15. Modification 15

According to the embodiment described above, the controller 30 calculates the average voltage $V_{ave}$ by dividing the power generation voltage by the number of the cells 100. In a modified configuration that the cell voltage meter 91 is connected with all the cells 100 of the fuel cell stack 40 and measures the cell voltages of all the cells 100, the average voltage $V_{ave}$ may be calculated by averaging the values of measured cell voltages of all the cells 100.

F16. Modification 16

The boundary between the main cell group 100s and the end cell group 100h may be changed appropriately.

F17. Modification 17

The motor vehicle 1 may be a connected car. The connected car is an automobile that is provided with communication equipment to receive services by cloud communications. In this modification, for example, the various determinations described above may be performed, based on information obtained by such communications.

The disclosure is not limited to any of the embodiment and its modifications described above but may be implemented by a diversity of other configurations without departing from the scope of the disclosure. For example, the technical features of any of the embodiment and its modifications may be replaced or combined appropriately, in order to solve part or all of the problems described above or in order to achieve part or all of the advantageous effects described above. Any of the technical features may be omitted appropriately unless the technical feature is described as essential herein. For example, the present disclosure may be implemented by any of aspects described below.

(1) According to one aspect of the disclosure, there is provided a fuel cell system. This fuel cell system comprises a fuel cell stack configured by stacking a plurality of cells in a stacking direction, each cell receiving supplies of an anode gas and a cathode gas to generate electric power; a temperature regulating mechanism configured to regulate temperature of the fuel cell stack; a first temperature gauge configured to measure a first temperature value that reflects the temperature of the fuel cell stack; a power generation voltage meter configured to measure a power generation voltage by the fuel cell stack; a cell voltage meter configured to measure a cell voltage with respect to at least part of the plurality of cells as measurement object cells; and a controller configured to control the temperature regulating mechanism such as to perform a temperature rise of the fuel cell stack by using at least the cell voltage measured by the cell voltage meter and the first temperature value measured by the first temperature gauge. The controller is further configured to start the temperature rise of the fuel cell stack when at least one cell voltage among cell voltages of the measurement object cells is lower than a predetermined voltage value. When at least one of a plurality of time measurement conditions is satisfied after the first temperature value has reached a first reference temperature after the start of the temperature rise, the controller measures a time duration during which a voltage difference by subtracting the at least one cell voltage among the cell voltages of the measurement object cells from an average voltage of the plurality of cells of the fuel cell stack is maintained to be not greater than a predetermined voltage difference, wherein the average voltage of the plurality of cells of the fuel cell stack is determined from the voltage measured by the cell voltage meter or by the power generation voltage meter; and when none of the plurality of time measurement conditions is satisfied, the controller does not measure the time duration. When the measured time duration reaches a first reference time, the controller controls the temperature regulating mechanism, such as to terminate the temperature rise. The plurality of time measurement conditions include a first condition, a second condition, a third condition and a fourth condition. The first condition is a condition that a predetermined time period has elapsed since termination of a warm-up operation that uses heat generated in the fuel cell stack to warm up the fuel cell stack. The second condition is a condition that a predetermined time period has elapsed since termination of an intermittent operation that is performed to temporarily stop power generation by the fuel cell stack. The third condition is a condition that a predetermined time period has elapsed since termination of regenerative braking that regenerates electric power generated by a driving motor included in a vehicle equipped with the fuel cell system, such as to be used as a braking force of the vehicle. The fourth condition is a condition that a predetermined time period has elapsed since a shift of state of the fuel cell stack to a power generation capable state after a start of the fuel cell system.

When the plurality of time measurement conditions are not satisfied, the cathode gas is unlikely to be sufficiently supplied to the fuel cell stack. There is accordingly a possibility that the cell voltage is decreased due to a reason other than the flooding. According to the fuel cell system of this aspect, however, when at least one of the plurality of time measurement conditions is satisfied, the controller is configured to measure the time duration for termination of the temperature rise, i.e., the time duration during which the voltage difference by subtracting the at least one cell voltage among the cell voltages of the measurement object cells from the average voltage of the plurality of cells is maintained to be not greater than the predetermined voltage difference. Otherwise the controller is configured not to measure the time duration. This configuration enables the time duration for termination of the temperature rise to be measured appropriately and thereby suppresses the cell from being excessively dried by the temperature rise of the fuel cell stack.

(2) The fuel cell system of the above aspect may further comprise a cathode gas supply flow path configured to supply the cathode gas to the fuel cell stack; a cathode gas discharge flow path configured to discharge a cathode off-gas from the fuel cell stack; a bypass flow path branched off from the cathode gas supply flow path at a position on an upstream side of the fuel cell stack and connected with the cathode gas discharge flow path; and a flow dividing valve provided at a position of connection of the cathode gas supply flow path and the bypass flow path and configured to change over a flow direction of the cathode gas to either a fuel cell stack side or a bypass flow path side. The controller may controls the flow dividing valve such as to change over the flow direction of the cathode gas. The predetermined time period in each of the first condition, the second condition, the third condition and the fourth condition may be a time period that is equal to or longer than a time period until the controller controls the flow dividing valve to change over the flow direction of the cathode gas from the bypass flow path side toward the fuel cell stack side and causes the cathode gas to be spread from the position of connection of the cathode gas supply flow path and the bypass flow path over into the fuel cell stack. In the fuel cell system of this aspect, the cathode gas is spread over into the fuel cell stack when a predetermined time period has elapsed since the cathode gas is flowed from the position of connection of the cathode gas supply flow path and the bypass flow path to the cathode gas supply flow path on the fuel cell stack side. This configuration enables the time duration for termination of the temperature rise to be measured appropriately and thereby suppresses the cell from being excessively dried.

(3) In the fuel cell system of the above aspect, even when the measured time duration has not yet reached the first reference time after a start of the temperature rise, the controller may controls the temperature regulating mechanism such as to terminate the temperature rise upon condition that a second reference time longer than the first reference time has elapsed since the first temperature value has reached the first reference temperature. In the fuel cell system of this aspect, the controller terminates the temperature rise when the second reference time has elapsed since the first temperature value has reached the first reference temperature after a start of the temperature rise. This configuration suppresses the cell from being excessively dried by extending the temperature rise time, for example, when none of the time measurement conditions is satisfied or when any of the time measurement conditions is satisfied but the voltage difference by subtracting the cell voltage from the average voltage does not become equal to or less than the predetermined voltage difference (4) In the fuel cell system of the above aspect, the cell voltage meter may measures voltage of a cell located at an end in the stacking direction of the fuel cell stack. In the fuel cell system of this aspect, the controller starts the temperature rise and terminate the temperature rise using the cell voltage of the cell located at the end in the stacking direction where the flooding is likely to occur. This configuration effectively eliminates the flooding.

(5) The fuel cell system of the above aspect may further comprise a second temperature gauge configured to measure a second temperature value that reflects temperature of the cell located at the end in the stacking direction of the fuel cell stack and input the measured second temperature value into the controller. The controller may controls the temperature regulating mechanism such as to terminate the temperature rise, when the first temperature value is lower than the first reference temperature after a start of the temperature rise and a third reference time has elapsed since the second temperature value has reached a second reference temperature that is a temperature lower than the first reference temperature. In the fuel cell system of this aspect, even when the first temperature value that reflects the temperature of the fuel cell stack is lower than the first reference temperature, the controller terminates the temperature rise upon condition that the third reference time has elapsed since the second temperature value reflecting the temperature of the cell at the end in the stacking direction where the flooding is likely to occur has reached the second reference temperature lower than the first reference temperature. This configuration more effectively suppresses the cell from being excessively dried.

(6) In the fuel cell system of the above aspect, the fuel cell stack may comprise an end plate that is located at an end in the stacking direction and includes a supply port and a discharge port of the anode gas formed therein. The fuel cell system of this aspect may further comprise a hydrogen pump mounted to the end plate and configured to supply a gas discharged from the discharge port to the supply port; and a second temperature gauge configured to measure a second temperature value that is a temperature of the hydrogen pump and input the measured second temperature value into the controller. The controller may be configured to control the temperature regulating mechanism such as to terminate the temperature rise, when the first temperature value is lower than the first reference temperature after a start of the temperature rise and a third reference time has elapsed since the second temperature value has reached a second reference temperature that is a temperature lower than the first reference temperature. In the fuel cell system of this aspect, the hydrogen pump is mounted to the end plate, so that the second temperature value measured by the second temperature gauge configured to measure the temperature of the hydrogen pump reflects the temperature of the cell at the end in the stacking direction of the fuel cell stack. Even when the first temperature value that reflects the temperature of the fuel cell stack is lower than the first reference temperature, the controller terminates the temperature rise upon condition that the third reference time has elapsed since the second temperature value reflecting the temperature of the cell at the end in the stacking direction where the flooding is likely to occur has reached the second reference temperature lower than the first reference temperature. This configuration more effectively suppresses the cell from being excessively dried. Additionally, this configuration does not require a temperature gauge separately provided for measuring the temperature of the cell at the end in the stacking direction. This results in simplifying the configuration of the fuel cell system.

(7) The fuel cell system of the above aspect may further comprise an impedance meter configured to measure an impedance of the fuel cell stack and input the measured impedance into the controller. The controller may terminates the temperature rise when the first temperature value is lower than the first reference temperature after a start of the temperature rise and the measured impedance is higher than a predetermined value. This configuration more effectively suppresses the cell from being excessively dried by the temperature rise.

The present disclosure may be implemented by various aspects other than the aspects of the fuel cell system described above, for example, a temperature rise method employed by the fuel cell system, a program configured to implement this method, and a non-transitory storage medium in which this program is stored.

What is claimed is:
1. A fuel cell system, comprising:
a fuel cell stack configured by stacking a plurality of cells in a stacking direction, each cell receiving supplies of an anode gas and a cathode gas to generate electric power;
a temperature regulating mechanism configured to regulate temperature of the fuel cell stack;
a first temperature gauge configured to measure a first temperature value that reflects the temperature of the fuel cell stack;
a power generation voltage meter configured to measure a power generation voltage by the fuel cell stack;
a cell voltage meter configured to measure a cell voltage with respect to at least part of the plurality of cells as measurement object cells; and
a controller programmed to control the temperature regulating mechanism to perform a temperature rise of the fuel cell stack by using at least the cell voltage measured by the cell voltage meter and the first temperature value measured by the first temperature gauge, wherein the controller is further programmed to start the temperature rise of the fuel cell stack when at least one cell voltage among cell voltages of the measurement object cells is lower than a predetermined voltage value, when at least one of a plurality of time measurement conditions is satisfied after the first temperature value has reached a first reference temperature after a start of the temperature rise, the controller is programmed to measure a time duration during which a voltage difference by subtracting the at least one cell voltage among the cell voltages of the measurement object cells from an average voltage of the plurality of cells of the fuel cell stack is maintained to be not greater than a predetermined voltage difference, wherein the average voltage of the plurality of cells of the fuel cell stack is determined from the voltage measured by the cell voltage meter or by the power generation voltage meter; and when none of the plurality of time measurement conditions is satisfied, the controller is configured not to measure the time duration, when the measured time duration reaches a first reference time, the controller is programmed to control the temperature regulating mechanism, to terminate the temperature rise, wherein the plurality of time measurement conditions include a first condition, a second condition, a third condition and a fourth condition, wherein the first condition is a condition that a first predetermined time period has elapsed since termination of a warm-up operation that uses heat generated in the fuel cell stack to warm up the fuel cell stack, the second condition is a condition that a second predetermined time period has elapsed since termination of an intermittent operation that is performed to temporarily stop power generation by the fuel cell stack, the third condition is a condition that a third predetermined time period has elapsed since termination of regenerative braking that regenerates electric power generated by a driving motor included in a vehicle equipped with the fuel cell system, to be used as a braking force of the vehicle, and the fourth condition is a condition that a fourth predetermined time period has elapsed since a shift of state of the fuel cell stack to a power generation capable state after a start of the fuel cell system.

2. The fuel cell system according to claim 1, wherein the cell voltage meter is configured to measure voltage of a cell located at an end in the stacking direction of the fuel cell stack.

3. The fuel cell system according to claim 1, wherein even when the measured time duration has not yet reached the first reference time after the start of the temperature rise, the controller is programmed to control the temperature regulating mechanism to terminate the temperature rise upon condition that a second reference time longer than the first reference time has elapsed since the first temperature value has reached the first reference temperature.

4. The fuel cell system according to claim 1, further comprising:

an impedance meter configured to measure an impedance of the fuel cell stack and input the measured impedance into the controller, wherein the controller is programmed to terminate the temperature rise when the first temperature value is lower than the first reference temperature after the start of the temperature rise and the measured impedance is higher than a predetermined value.

5. The fuel cell system according to claim 1, further comprising:

a second temperature gauge configured to measure a second temperature value that reflects temperature of the cell located at an end in the stacking direction of the fuel cell stack and input the measured second temperature value into the controller, wherein the controller is programmed to control the temperature regulating mechanism to terminate the temperature rise, when the first temperature value is lower than the first reference temperature after the start of the temperature rise and a third reference time has elapsed since the second temperature value has reached a second reference temperature that is a temperature lower than the first reference temperature.

6. The fuel cell system according to claim 1, wherein the fuel cell stack comprises an end plate that is located at an end in the stacking direction and includes a supply port and a discharge port of the anode gas formed therein, the fuel cell system further comprising:

a hydrogen pump mounted to the end plate and configured to supply a gas discharged from the discharge port to the supply port; and a second temperature gauge configured to measure a second temperature value that is a temperature of the hydrogen pump and input the measured second temperature value into the controller, wherein the controller is programmed to control the temperature regulating mechanism to terminate the temperature rise, when the first temperature value is lower than the first reference temperature after the start of the temperature rise and a third reference time has elapsed since the second temperature value has reached a second reference temperature that is a temperature lower than the first reference temperature.

7. The fuel cell system according to claim 1, further comprising:

a cathode gas supply flow path configured to supply the cathode gas to the fuel cell stack;

a cathode gas discharge flow path configured to discharge a cathode off-gas from the fuel cell stack;

a bypass flow path branched off from the cathode gas supply flow path at a position on an upstream side of the fuel cell stack and connected with the cathode gas discharge flow path; and a flow dividing valve provided at a position of connection of the cathode gas supply flow path and the bypass flow path and configured to change over a flow direction of the cathode gas to either a fuel cell stack side or a bypass flow path side, wherein the controller is programmed to control the flow dividing valve to change over the flow direction of the cathode gas, wherein the predetermined time period in each of the first condition, the second condition, the third condition and the fourth condition is a time period that is equal to or longer than a time period until the controller controls the flow dividing valve to change over the flow direction of the cathode gas from the bypass flow path side toward the fuel cell stack side and causes the cathode gas to be spread from the position of connection of the cathode gas supply flow path and the bypass flow path over into the fuel cell stack.

* * * * *